United States Patent
Ramaciotti et al.

[19]

[11] Patent Number: 5,806,912
[45] Date of Patent: Sep. 15, 1998

[54] CONVERTIBLE AUTOMOBILE HAVING A DIVISIBLE AND SWINGABLE RIGID ROOF

[75] Inventors: Lorenzo Ramaciotti; Riccardo Majocchi, both of Turin; Bruno Gho, Rivoli; Alberto Cavaletto, Turin, all of Italy

[73] Assignee: Pininfarina SPA, Turin, Italy

[21] Appl. No.: 611,844

[22] Filed: Mar. 8, 1996

[30] Foreign Application Priority Data

Sep. 22, 1995 [IT] Italy .................................. T095A0753

[51] Int. Cl.$^6$ ........................................................ B60J 7/00
[52] U.S. Cl. ........................................................ 296/107
[58] Field of Search ................................... 296/107, 116, 296/117

[56] References Cited

U.S. PATENT DOCUMENTS

| | | | |
|---|---|---|---|
| 4,776,630 | 10/1988 | Fukutomi et al. | 296/117 |
| 5,209,544 | 5/1993 | Benedetto et al. | 296/107 |
| 5,558,388 | 9/1996 | Fürst et al. | 296/107 |

FOREIGN PATENT DOCUMENTS

| | | | |
|---|---|---|---|
| 2693956 A1 | 1/1994 | France | 296/107 |
| 2694245 A1 | 2/1994 | France | 296/107 |
| 2696375 A1 | 4/1994 | France | 296/107 |
| 3721895 | 1/1989 | Germany | 296/107 |
| 650980 | 8/1985 | Switzerland | 296/107 |

*Primary Examiner*—Gary C. Hoge
*Attorney, Agent, or Firm*—Sughrue, Mion, Zinn, Macpeak & Seas, PLLC

[57] ABSTRACT

A convertible automobile having a divisible roof formed by a rear roll-bar rigid element and by a rigid top element which can be displaced to a retracted position in which the roof is partially opened. This displacement is performed according to a first tilting step whereby the top element is rotated substantially about its front side so as to lower its rear side beneath the roll-bar element, and a second step whereby the top element is transferred completely within the roll-bar element. The roll-bar element with the top element thus fitted therein can then be lowered, by a rearward swinging, into a rear storage compartment of the automobile, having an associated cover movable between an advanced closed position and a retracted open position of the storage compartment.

6 Claims, 9 Drawing Sheets

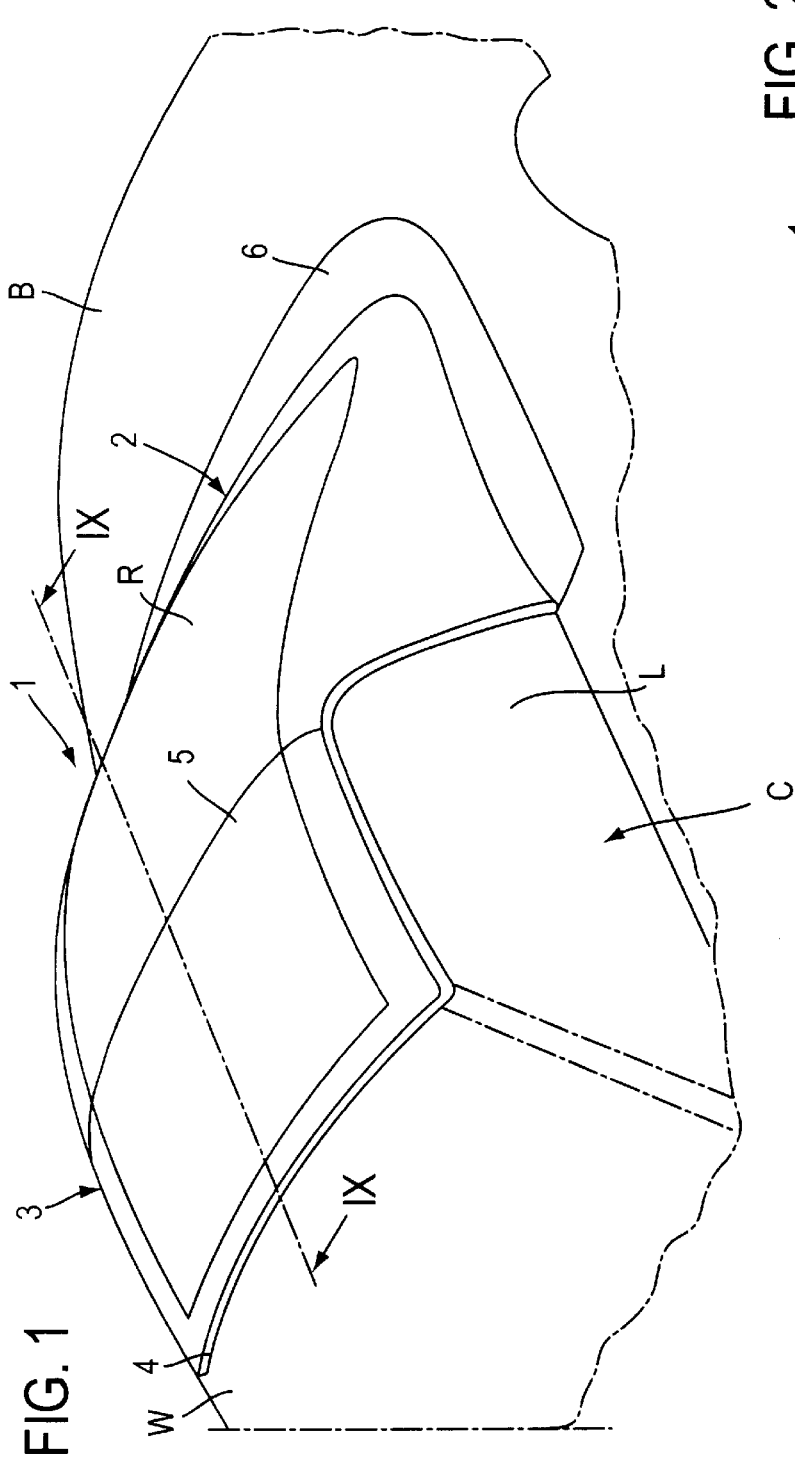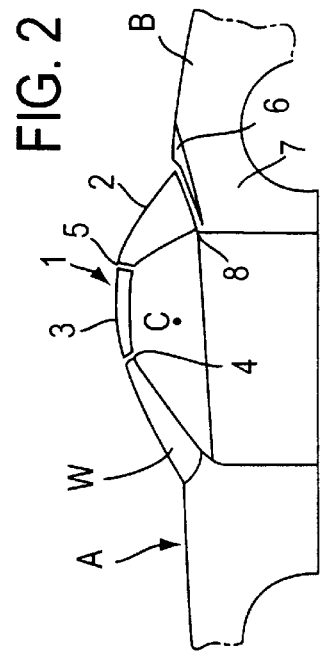

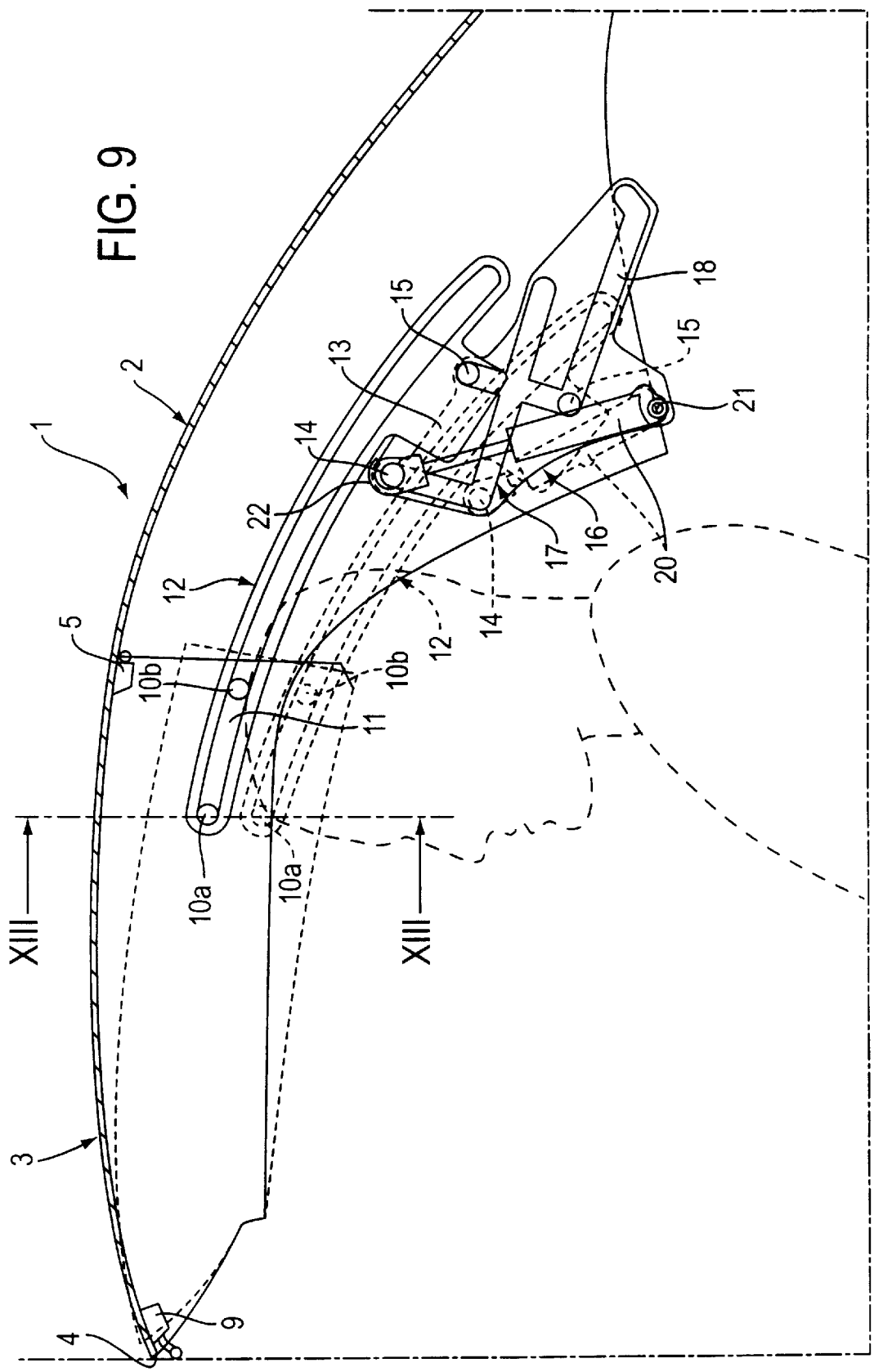

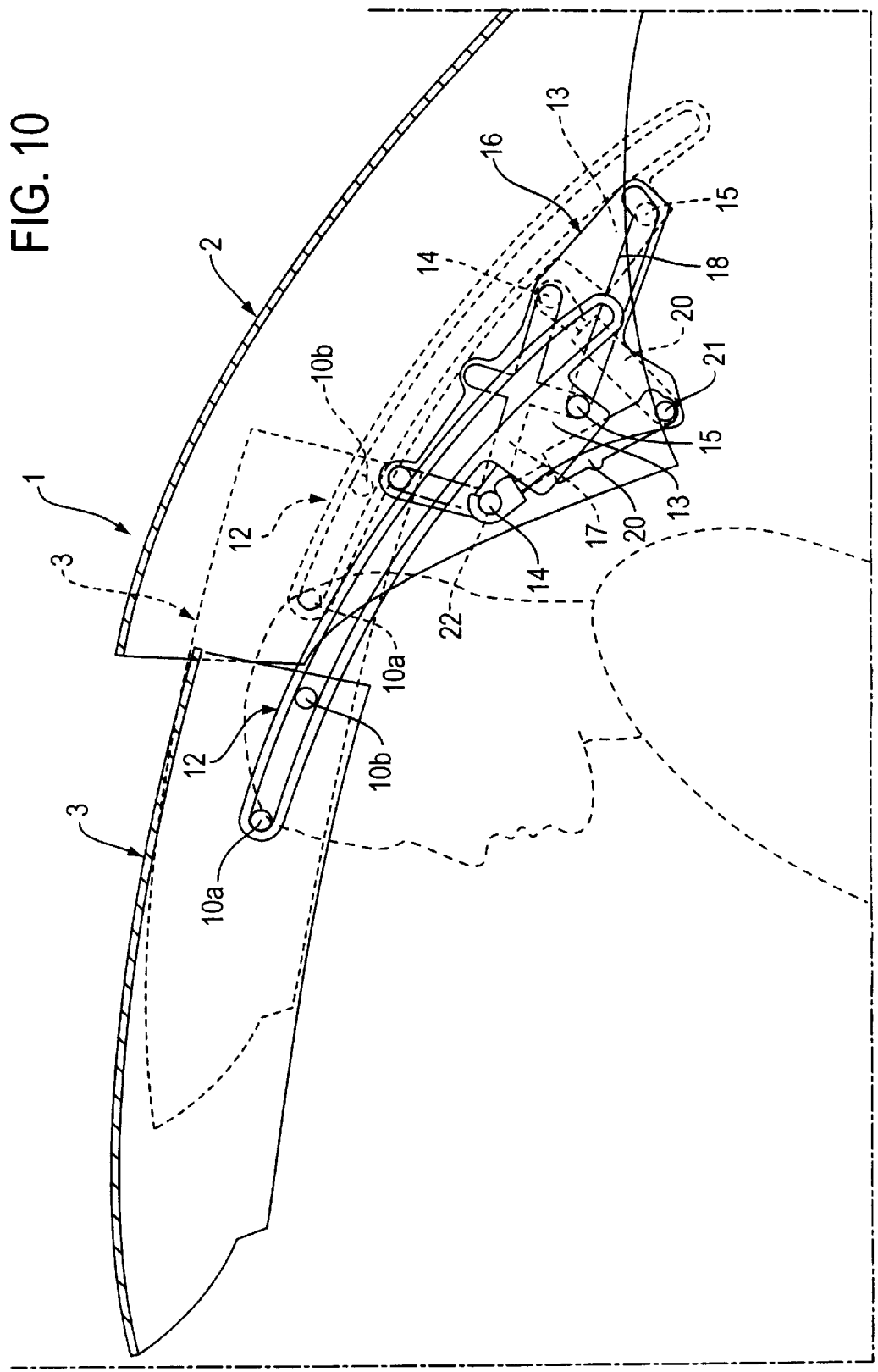

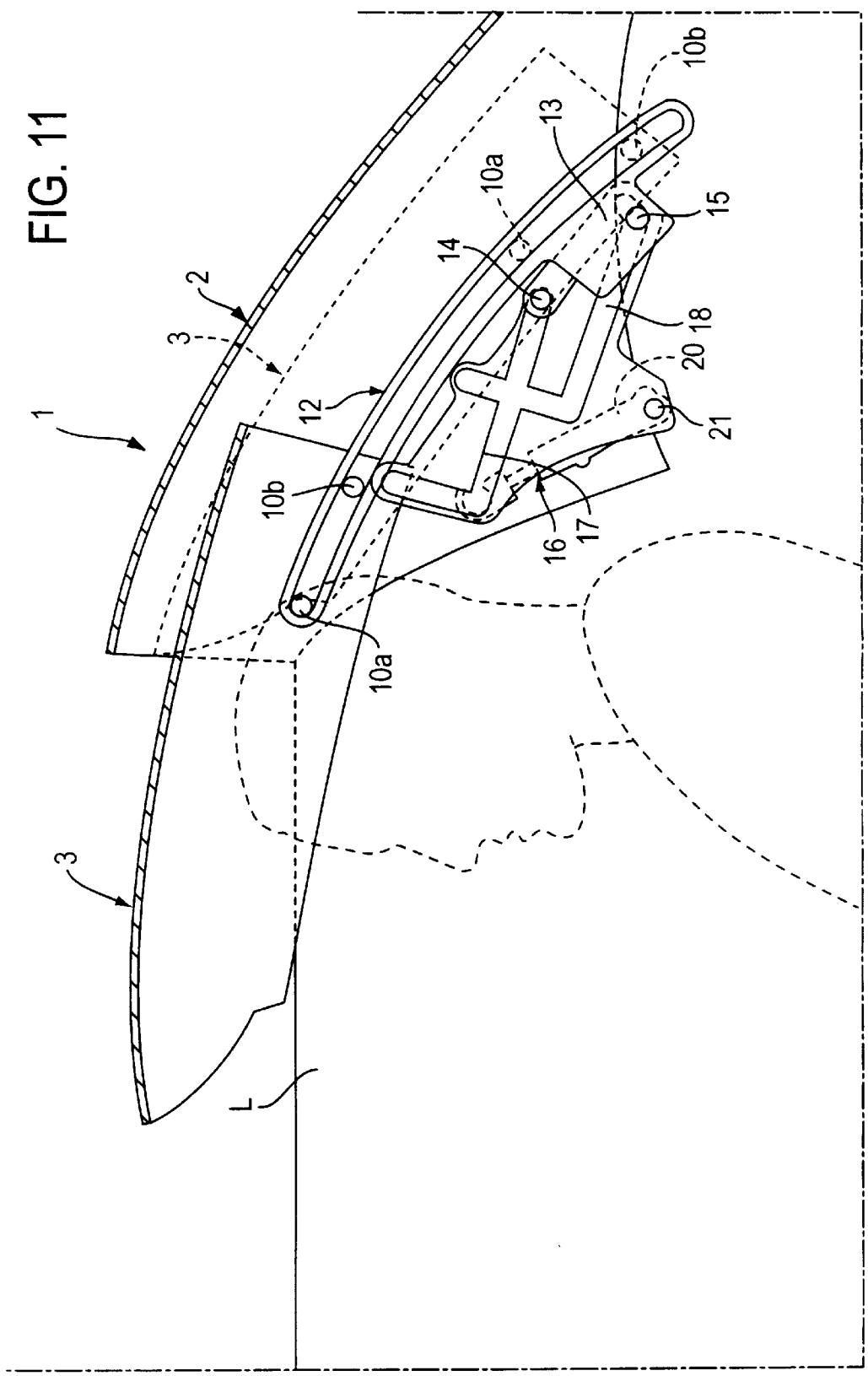

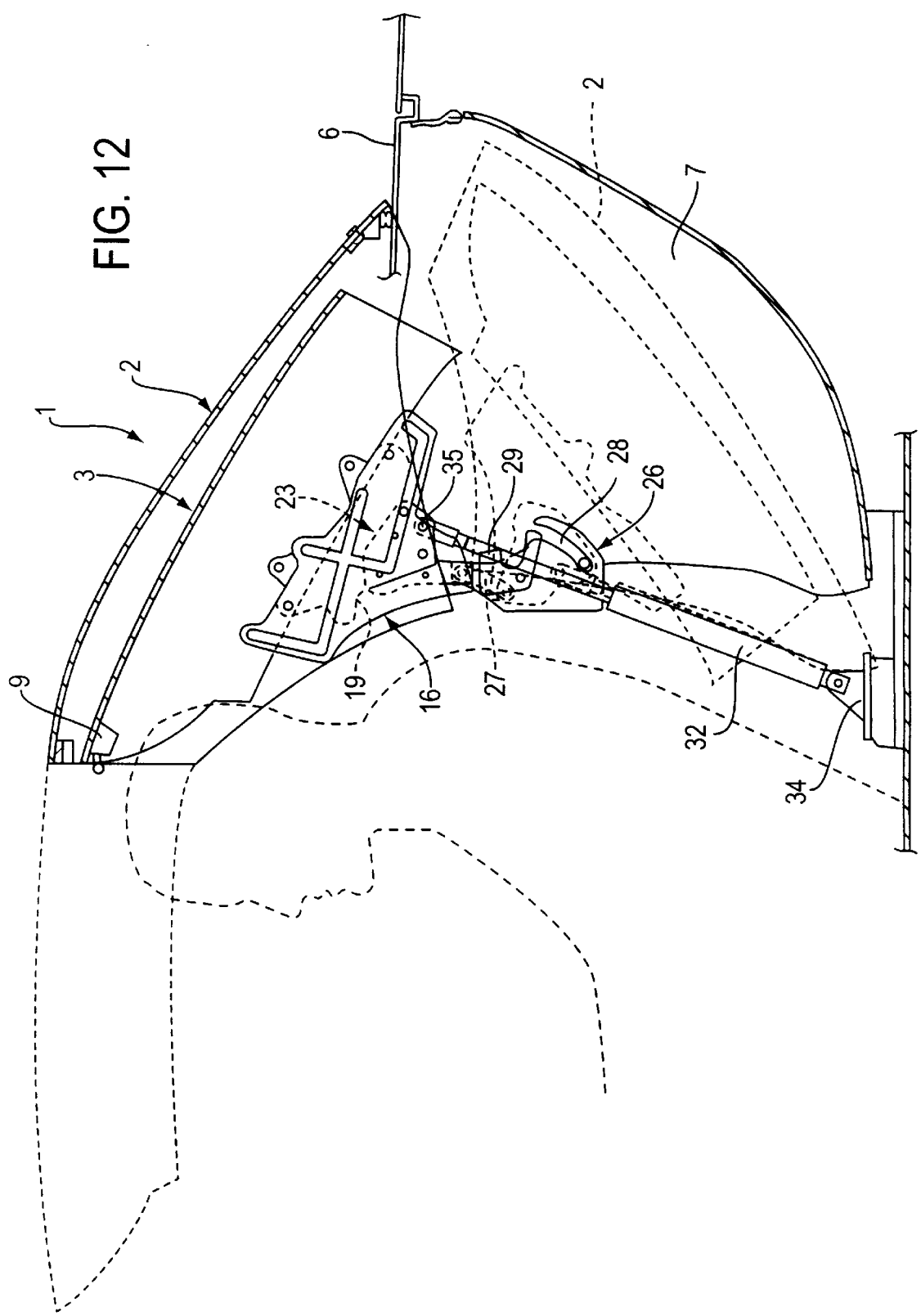

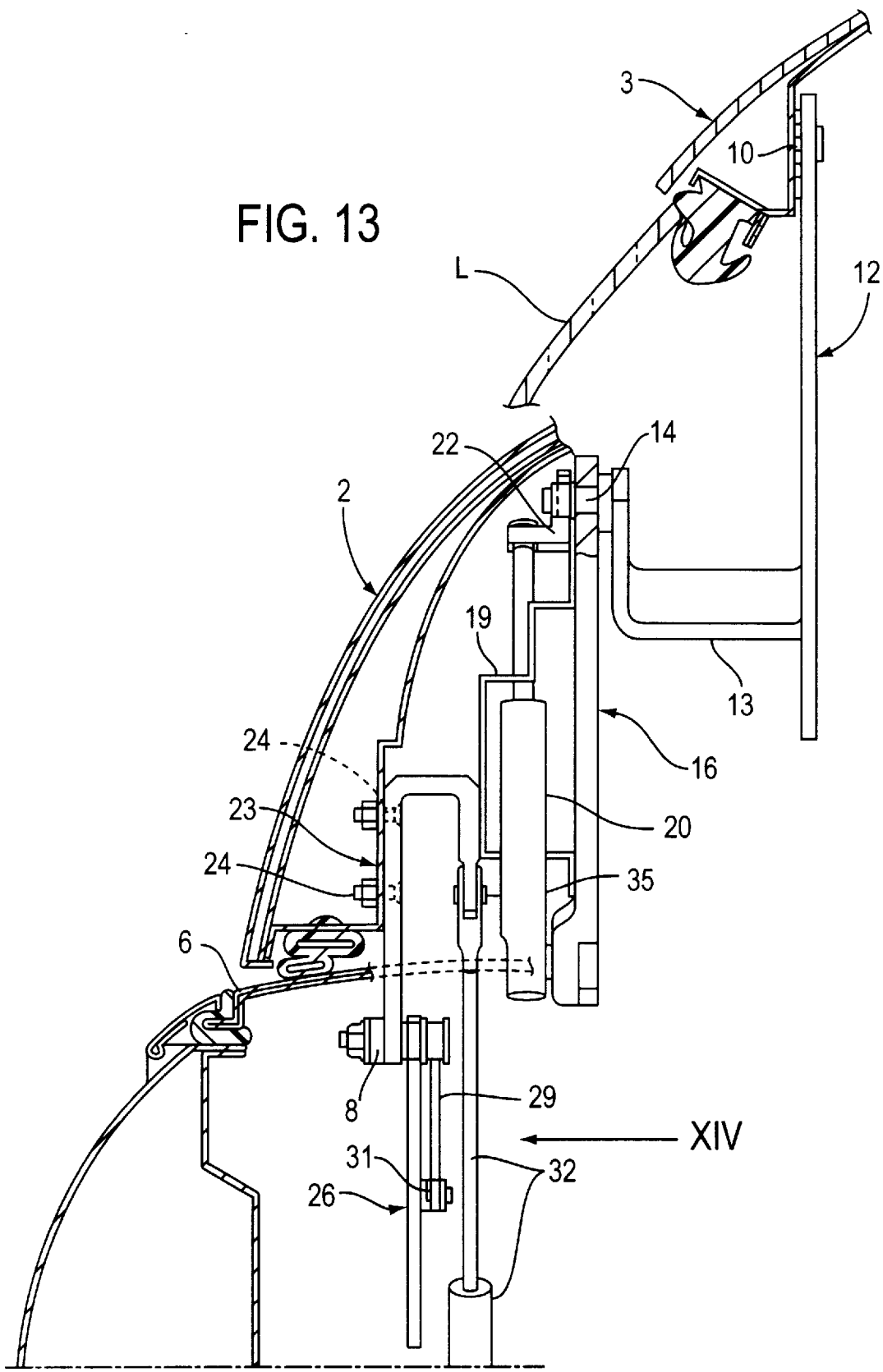

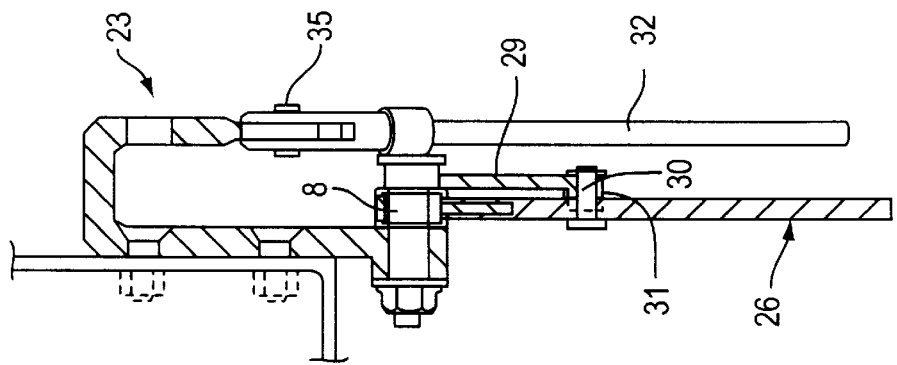
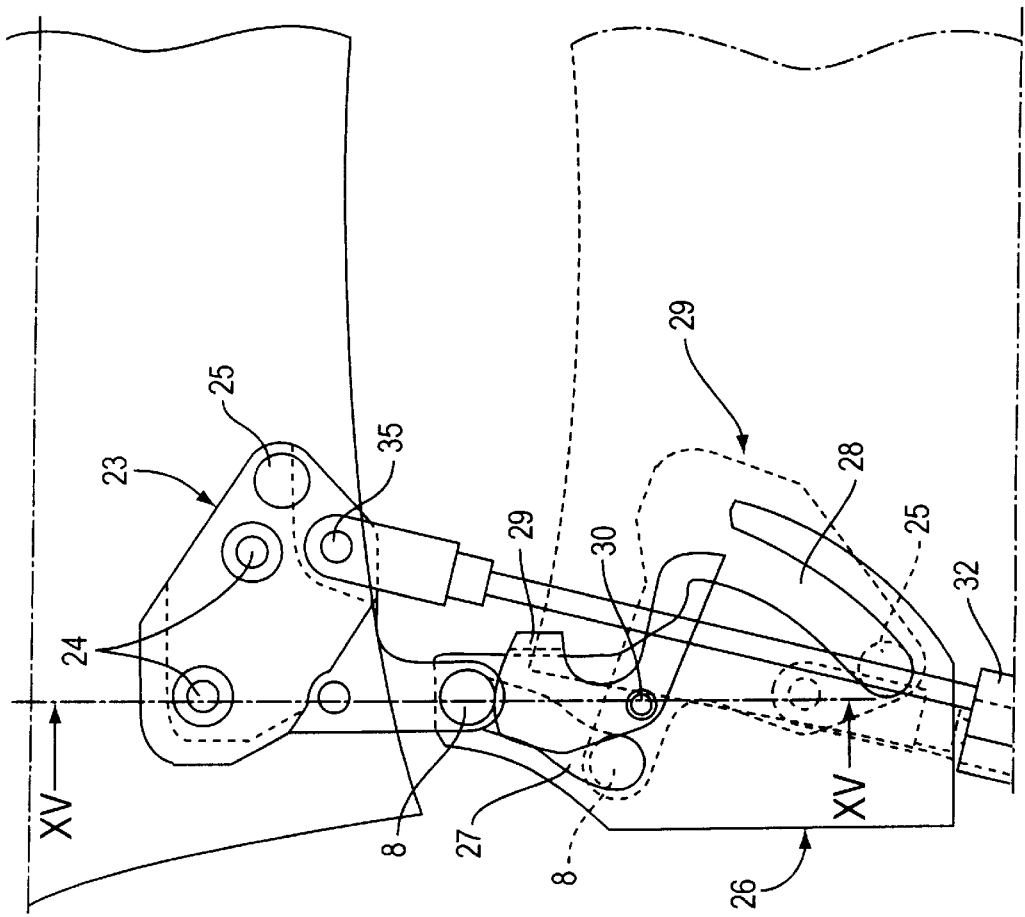

ated are known in the art, for example, from U.S. Pat.
CONVERTIBLE AUTOMOBILE HAVING A DIVISIBLE AND SWINGABLE RIGID ROOF

BACKGROUND OF THE INVENTION

The present invention is generally related to convertible automobiles having a divisible and swingable rigid roof (hard-top).

Traditionally such convertible automobiles comprise a front windscreen structure and a roof adapted to be opened, formed by a rear roll-bar rigid element having a rear window, and by a rigid top element which, in a closed condition of the roof, is interposed between the upper edges of the windscreen structure and of the roll-bar element. According to some known arrangements, the top element is displaceable to a retracted position in which the roof is partially opened, and wherein this top element is located in the area of the roll-bar element, and in this partially open position of the roof the top element and the roll-bar element are then both jointly swingable towards a rear storage compartment of the automobile, so as to accomplish full opening of the roof.

In the following specification the term "rear roll-bar rigid element" is intended to conventionally designate a structure which normally closes in the rear the passenger compartment of the vehicle and has two lateral walls between which the rear window is located. Under the term "rigid top element" it is to be conventionally intended in the following a substantially panel-like structure, even at least in part transparent and whose opposite sides, in the closed condition of the roof, are situated above the lateral windows of the vehicle.

A convertible automobile having a divisible and swingable rigid roof of the above-referenced type is known, for instance, from Swiss patent CH-650.980, generally disclosing and illustrating several alternative arrangements. In the case of FIGS. 1–8 of the above document, the rigid top element and the rigid roll-bar element are pivotally connected therebetween, so that the opening displacement of the former is operated by virtue of the downwardly tilting of the latter, following rearwardly rotation thereof. In the fully open condition of the roof, the roll-bar element is housed within the luggage compartment of the vehicle, while the top element is positioned outside, as a cover closing this compartment. A similar solution is shown in FIGS. 9 through 17 of the same prior document, in which however the pivoted connection between the top element and the roll-bar element is indirect, via a pair of arms, and lowering of the roll-bar element into the storage compartment is performed by means of a forward rotation. In these constructions the partially open position of the top member is only transient, in the sense that it is not possible to maintain a configuration of the automobile in a so-called "targa" disposition, which is intermediate between the fully open and the fully closed positions of the roof. Same is the case of the embodiment disclosed in the Swiss document with reference to FIGS. 35 through 38, in which the top element and the roll-bar element are made in one piece.

In the case of the embodiment disclosed with reference to FIGS. 39–43 of the above Swiss document, the top element is slidable relative to the roll-bar element, and thus it may be retracted over the latter in order to carry out, in the partially open position, the so called "targa" configuration. Then, to provide complete opening, the top member and the roll-bar member can be jointly lowered, by means of a forward rotation, into the storage compartment of the vehicle. Also in this case the top element is kept above the roll-bar element as a cover for closing the storage compartment.

SUMMARY OF THE INVENTION

The object of the present invention is to provide a convertible automobile of the above-referenced type having a novel and peculiar divisible and swingable rigid roof arrangement enabling, in a partially or totally automatic way, conversion from the fully closed position to the partially open position and up to the fully open position of the roof, and vice-versa, with a rational and compact structure having a reduced encumbrance, so as to exploit in the best way the available narrow space.

A further object of the invention is to provide a convertible automobile of the above-referenced type in which, in the fully open position of the roof, the arrangement of the movable components thereof be such to keep the geometry, and thus the loading capacity of the rear luggage compartment of the vehicle, substantially unchanged.

Still a further object of the invention is to provide a convertible automobile of the above-referenced type which, in the fully open position of the roof, provides a configuration in any respect corresponding to that of a conventional "spider" car having a flexible foldable roof, so as to afford a particularly appreciable aesthetical effect.

According to the invention, the above objects are primarily achieved by virtue of the fact that displacement of the top element towards said partially open position of the roof comprises a first tilting step in which said top element is rotated substantially about the front side thereof so as to lower the rear side thereof below the roll-bar element, and a second step in which said top element is transferred to the inside of the roll-bar element; of the fact that the joint lowering of said roll-bar element and said top element housed therein is performed by overturning rearwardly said roll-bar element until complete insertion thereof into said storage compartment; and of the fact that a rigid cover is associated, in a way known per se, to the storage compartment, said cover being displaceable between an advanced closing position and a retracted opening position of said storage compartment.

Convertible automobiles having a lowered roof storage compartment to which an openable and closable cover is associated are known in the art, for example, from U.S. Pat. No. 5,090,764 and U.S. Pat. No. 5,209,544.

According to a preferred embodiment of the invention, the automobile comprises:

a pair of movable brackets arranged at opposite sides of the top element, extending within said roll-bar element and formed with respective longitudinal guide members in each one of which a respective pair of first spaced-apart transverse pins are engaged which are fixed to the top element, each movable bracket carrying a pair of second transverse pins, a pair of stationary brackets correspondingly arranged at opposite sides of the roll-bar element and formed with respective guide grooves slidably engaged by said pairs of second transverse pins of the movable brackets according to a sliding sequence from above downwardly and from the front rearwardly, and vice-versa; the arrangement being such that, during displacement of the top element towards said partially open position following said first tilting step, the movable brackets run jointly with the top element up to the end of displacement of said second pins along the respective guide grooves of the stationary brackets, and then said top element is displaced relative to the movable brackets due to sliding of said first pins along the longitudinal guide members of said movable brackets.

In such a preferred embodiment, the convertible automobile according to the invention further comprises:
  a pair of movable plates fixed to the opposite sides of the roll-bar element in proximity of said stationary brackets and each carrying a respective upper-rear transverse pin and a respective lower-front transverse pin,
  a pair of stationary plates placed beneath said movable plates and each formed with a respective guide slot along which the lower transverse pin is rotatably and slidably engaged, and with an upwardly open guide slit adapted to be slidably engaged by the upper transverse pin of the respective movable plate so as to guide according to a rotary-linear motion the rearward swinging of said roll-bar element together with said top element placed therein.

BRIEF DESCRIPTION OF THE DRAWINGS

Additional features of the invention will become apparent from the following detailed description, with reference to a preferred embodiment purely illustrated by way of non limiting example in the annexed drawings, in which:

FIG. 1 is a partial and diagrammatic perspective view of a convertible automobile according to the invention, having a divisible and swingable rigid roof shown in its closed position, FIG. 2 through 7 are diagrammatic side elevational views showing the automobile of FIG. 1 during the succession of steps for the partial opening and the total opening of the roof, FIG. 9 is a diagrammatic vertical section along line IX—IX of FIG. 1, FIG. 10 through 12 are views same as FIG. 9 showing in successive steps the displacement of the top element towards the partially open position of the roof, FIG. 13 is a vertical section along line XIII—XIII of FIG. 9, FIG. 14 is a side elevational view showing in an enlarged scale the detail indicated by arrow XIV in FIG. 13 during the overturning step to the fully open position of the roof, and FIG. 15 is a vertically sectioned view along line XV—XV of FIG. 14.

DETAILED DESCRIPTION OF THE INVENTION

Figure 3:
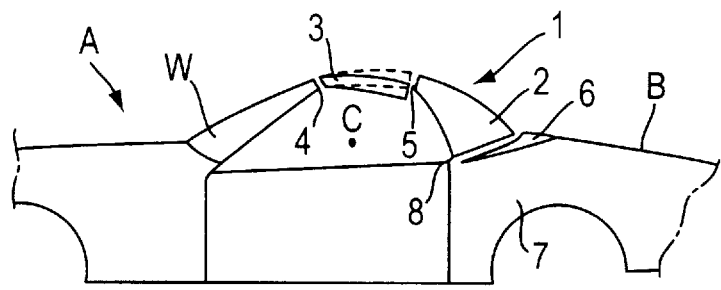

Referring initially to FIG. 1, with A an automobile according to the invention is partially depicted, whose passenger compartment C is delimited, rearwardly of a windscreen structure W, by a divisible and swingable rigid roof 1.

The roof 1 is essentially constituted by a rear roll-bar rigid element 2 provided with a rear window R, and by a rigid top element 3, which is conveniently at least in part transparent. In the closed configuration of the roof 1 shown in FIG. 1, the top element 3 is sealingly interposed between the upper edge 4 of the windscreen structure W and the upper edge 5 of the roll-bar element 2. The opposite sides of the top element 3 are adapted, in a generally conventional way, to provide a sealed closure with the upper edges of the lateral windows L of the automobile A.

Referring now to FIGS. 2 through 7, the roof 1, starting from the completely closed configuration of FIG. 1 also diagrammatically depicted in FIG. 2, is convertible through a peculiar displacement of its components, into a partially open configuration and then into a fully open configuration, and vice-versa.

Figure 4:
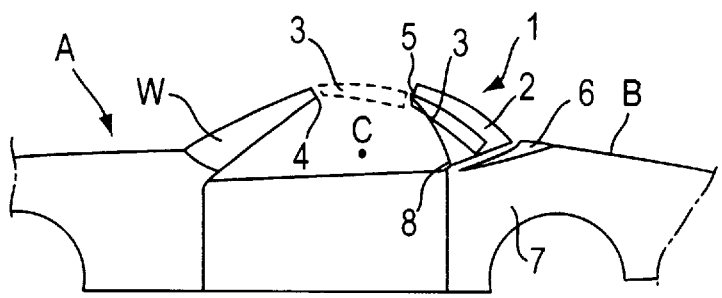
Figure 5:
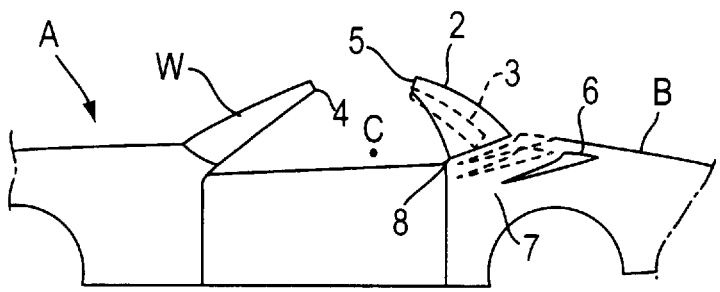
Figure 6:
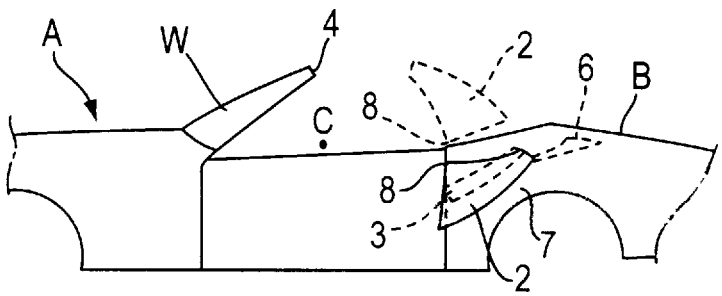

The successive opening operations of the roof 1 comprise a first tilting step of the top element 3, starting from the position of FIG. 2, in which the top element 3 is rotated substantially about its front side so as to lower its rear side beneath the roll-bar element 2, such as shown in FIG. 3. Then, in a second step, the top element 3 is linearly moved so as to be retracted inside the roll-bar element 2, whereby it is arranged completely within the encumbrance space of the latter, such as depicted in FIG. 4. This configuration, conventionally designated as "targa", can be maintained or in turn converted into a configuration designated as "spider", i.e. in which the roof 1 is fully opened. To such effect the operative sequence further comprises rearwardly opening by a linear displacement or more conveniently by a rotary-linear motion, of a rigid rear cover 6. This cover 6, which in the fully closed and in the partially open configurations of the roof 1 is located beneath the lower edge of the roll-bar element 2 and is interposed between the latter and the rear luggage compartment B of the automobile A, is displaced such as diagrammatically shown in FIG. 5 towards the retracted position, within the rear luggage compartment B of the automobile A, so as to open access from above into a storage compartment 7 situated between the passenger compartment C and the luggage compartment B. In the retracted position of the cover 6, the assembly constituted by the roll-bar element 2 and by the top element 3 fitted therein is lowered into the storage compartment 7 following rearwardly turning over of the roll-bar element 2, such as shown in FIG. 6. This overturning is performed according to a rotary-linear motion of an axis generally designated as 8, corresponding to the front-lower edge of the roll-bar element 2, such as clarified in detail in the following.

Figure 7:
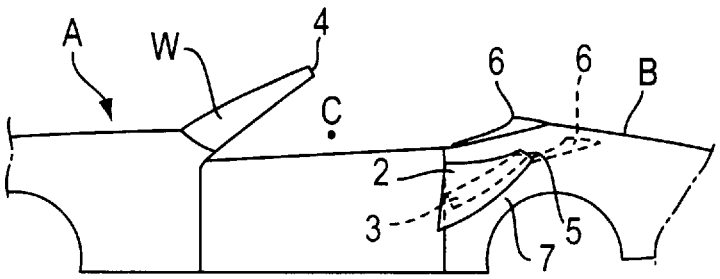

When the assembly consisting of the roll-bar element 2 with the top element 3 fitted therein is entirely housed inside the storage compartment 7, the cover 6 is finally re-positioned in the initial advanced and raised condition, so as to sealingly close the storage compartment 7 such as depicted in FIG. 7.

Return from the fully open configuration to the partially open up to the fully closed configuration of the roof 1 is accomplished carrying out the above disclosed operations in the opposite sequence.

These steps can be performed, entirely or in part, by means of powered servo-systems, with the aid of a control and check electrical circuit including limit switches or similar sensors adapted to synchronize the various movements. These servo-actuated systems may be of electrical-hydraulic and/or electrical-mechanical type: in the embodiment which will be disclosed in detail herebelow only some steps are power-driven, while other steps are manually carried out. In any case the consent to opening (or closing) of the roof 1 shall be given by means of a switch control, normally having two positions, which is to be actuated a first time for performing conversion from the fully open configuration to the partially open configuration, and a second time for conversion from the partially open configuration to the fully closed configuration of the roof 1, and vice-versa.

Figure 8:
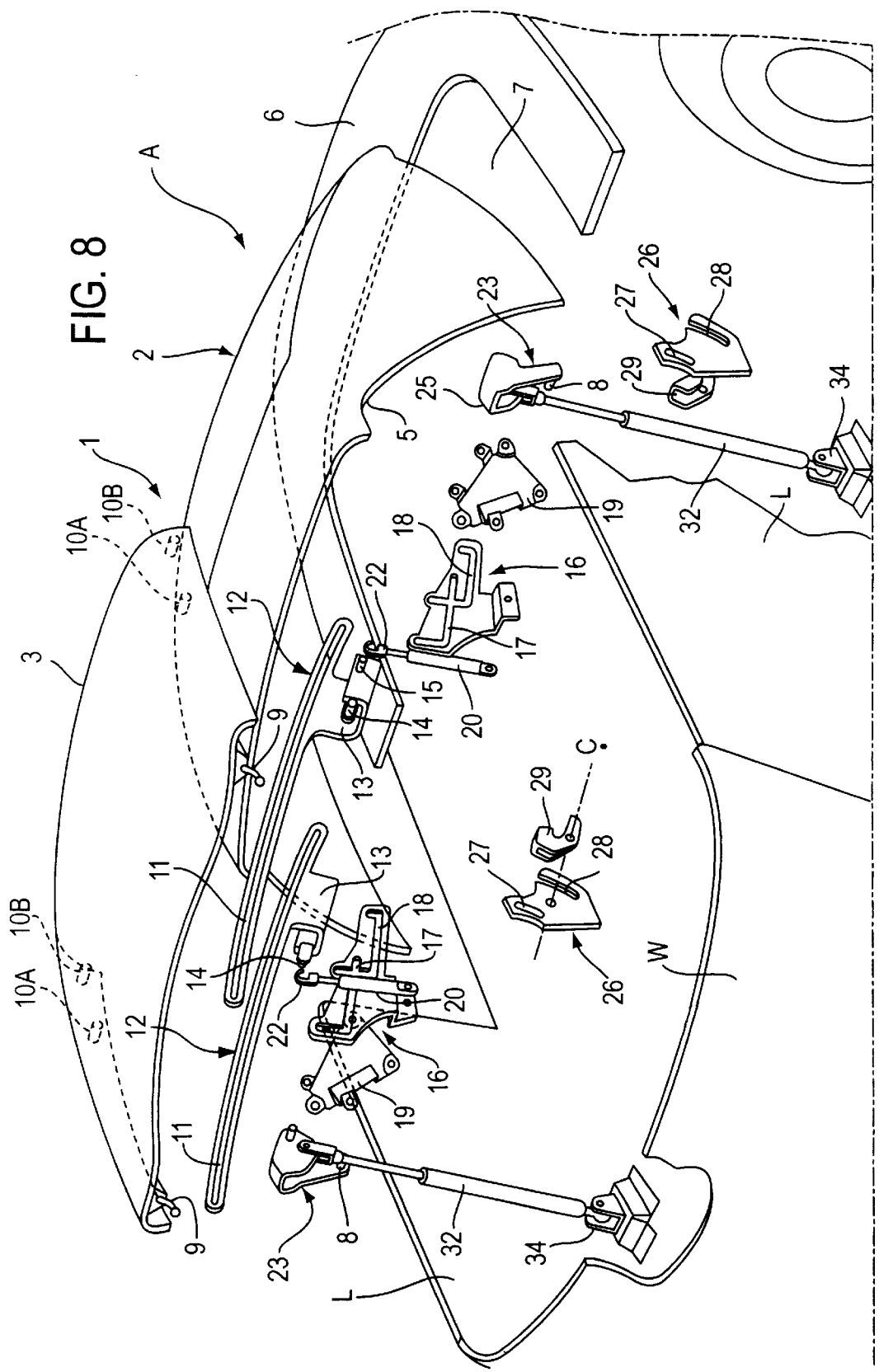
FIG. 8 is an exploded perspective view of FIG. 1 showing the essential components for opening and closing the roof.

Referring now in better detail to FIGS. 8, 9 and 13, the essential component elements by means of which firstly lowering and retracting of the top element 3 relative to the roll-bar element 2, and secondly overturning of the roll-bar element 2 with the top element 3 fitted therein are performed, will be now disclosed.

With specific reference to FIG. 9, the front edge of the top element 3 is provided in a generally conventional way, and thus not disclosed in detail, with centering elements, arranged for instance at the opposite ends of the front edge thereof and generally indicated as 9, for the sealed closure relative to the upper edge 4 of the windscreen structure W. Moreover locking means, not shown since also of a conventional type, are associated to the rear edge of the top element 3 and capable of being disengaged manually or in a powered way so as to allow opening of the top element 3.

In correspondence of its opposite lateral side, and at a short distance from its rear edge, the top element 3 carries two juxtaposed pairs of inner transverse pins 10a, 10b each of which is engaged within a respective longitudinal guiding groove 11 formed in a movable bracket 12 having an elongated shape, which projects rearwardly within the roll-bar element 2. In the fully closed position of the roof 1 shown in FIG. 9, and corresponding to FIGS. 1 and 2, the transverse pins 10a, 10b are slightly forcedly fitted in correspondence of the front sections of the guidrespectives 11 of the respective movable brackets 12.

In proximity of its respective rear end, each movable bracket 12 is formed with a substantially C-shaped support 13 facing outwardly and carrying a pair of second spaced-apart transverse pins 14, 15.

Reference numerals 16 designate two stationary brackets which are fixed to the opposite sides of the roll-bar element 2, with the interposition of respective intermediate mounting plates 19, in the area of the front-lower side of this roll-bar element 2.

As better shown in FIG. 9 (and in FIGS. 10 through 12), each movable bracket 16 is formed with a pair of respective guiding slits 17, 18, which are substantially L-shaped and intersecting each other. The second transverse pins 14, 15 of the respective movable bracket 12 are engaged within the guiding slits 17, 18 of each stationary bracket 16. More in detail, in the closed position of the top element 3 depicted in FIG. 9 (corresponding to FIGS. 1 and 2), the pins 14 and 15 are located on top of the initial upwardly-facing branches of the guiding slits 17, 18, while, in the fully retracted position of the top element 3 inside the roll-bar element 2, corresponding to FIG. 4 and shown in detail in FIG. 12, these pins 14, 15 are located in correspondence of the rear ends of the rearwardly-extending branches of these guiding slits 17, 18. The displacement sequence of the pins 14, 15 relative to the slits 17 and 18 will be disclosed in better detail in the following.

Reference numerals 20 indicate two linear servo-actuators, for instance of hydraulic type, each of which has one end pivotally connected at 21 to the lower portion of one respective stationary bracket 16 and the other end of which is pivotally connected to the support 13 of the corresponding movable bracket 12, about the axis of the transverse pin 14. As better shown in FIG. 13, this pivotal connection is performed by means of a hook element 22 located at the end of the stem of the servo-actuator 20 and in which the transverse pin 14 is releasably engaged, in the way clarified herebelow.

Referring now in better detail to FIGS. 13, 14 and 15, reference numerals 23 indicate two movable plates secured to the opposite sides of the roll-bar element 2 in substantial correspondence of the stationary brackets 16. Each movable plate 23 is rigidly connected to the inner structure of the roll-bar element 2, for instance by means of attachment members 24 (FIG. 13), and may also be fixed at one or more points to the corresponding intermediate plate 19. Moreover, each movable plate 23 is generally C-shaped and carries a pair of respective transverse pins or rollers which, in the condition depicted in FIG. 13 and with full line in FIG. 14, are located one inferiorly and the other superiorly. In particular, the lower transverse pin is indicated as 8, since same defines the already mentioned rotation-translation axis of the roll-bar element 2 during overturning thereof into the storage compartment 7. The upper transverse pin of each movable plate 23 is designated as 25.

To each movable plate 23 a respective stationary plate 26 is operatively associated, which is arranged adjacent to the bottom of the storage compartment 7, i.e. beneath the respective movable plate 23. Each stationary plate 26 is formed in its front and upper area with a guiding slot 27, along which the lower transverse pin 8 of the respective movable plate 23 is rotatably and slidably engaged, and is formed in its rear and lower area with a guiding slit 28 which is open upwardly and adapted to be slidably engaged, in the way clarified herebelow, by the upper transverse pin 25 of the stationary plate 23.

To each stationary plate 26 a respective locking rocker element 29 is further associated, which is swingable about a pin 30 against the action of a return spring 31 and the function of which is to stop linear displacement of the pin 8 along the guiding slot 27 in the raised position of the movable plate 23, shown with dotted lines in FIG. 14. Tilting to an open position of the locking member 29, so as to allow downwardly displacement of the pin 8 along the slot 27 against the action of the spring 31, is operated by the pin 25 of the movable plate 23 itself, as will be clarified in detail in the following.

Reference numerals 32 designate two linear servo-actuators, for instance of hydraulic type, each of which is lowerly pivoted at 34 to one side of the automobile frame, in front of the storage compartment 7, and superiorly at 35 to a respective movable plate 23.

The rigid cover 6 for the opening/closure of the storage compartment 7 is not shown in detail, since the displacement system thereof is generally conventional. As already clarified in the above, displacement thereof from the closed position to the opened position (FIG. 5) is performed by means of a rotary-linear motion, so as to disengage it from the lower edge of the roll-bar element 2 and retract it inside the rear baggage compartment B of the automobile A. Displacement of the cover 6 from the opened position to the closed position (FIG. 7) is evidently performed in the opposite way by means of a linear-rotary motion.

With reference to FIGS. 9–12 the successive displacement steps of the top element 3 in order to achieve the partially open position of the roof 1 will now be disclosed.

As previously explained, FIG. 9 depicts the fully closed condition in which the centering members 9 keep the top element 3 in the front flush with the upper edge 4 of the windscreen structure W, and in the rear flush to the front-upper edge 5 of the roll-bar element 2. Sealing gaskets of conventional type, only diagrammatically depicted in the drawings, ensure tightness in the closed position. As also already clarified, in this position the two pairs of first transverse pins 10a, 10b are located in correspondence of the front ends of the guiding grooves 11 of the respective movable brackets 12, while the second pins 14 and 15 are located at the top of the guiding slits 17, 18 of the respective stationary brackets 16.

From this position, in order to open the top element 3 it is firstly necessary to release the rear locking members (not shown) and then operate, through activation of the linear actuators 20, tilting of the top element 3 following which the rear edge thereof is lowered below the front edge 5 of the roll-bar element 2. This step is shown in FIG. 10: as it is apparent, contraction of the actuators 20 causes descent of the transverse pins 14 and 15 down to the respective bottoms of the upwardly facing branches of the corresponding guiding slots 17 and 18.

From this position, the top element 3 can be retracted manually (or, as stated, even in a power-assisted way), so as to have the pins 14 and 15 displaced along the lower branches of the respective guiding slots 17, 18, until engagement of the rear ends thereof in the way depicted in FIG. 11. During this step the transverse pins 10a, 10b do not slide, i.e. are maintained stationary relative to the respective movable brackets 12, while the pins 14 disengage from the hook ends 22 of the respective actuators 20.

Then, a further backward push applied to the top element 3 produces sliding of the transverse pins 10a, 10b along the guiding grooves 11, which enables the top element 3 to be completely shifted inside the roll-bar element 2, up to the position shown in FIG. 12.

This position corresponds to the partially open condition of the roof 1, shown in FIG. 4.

Starting from this position, if the roof 1 is intended to be fully opened, it is necessary to provide consent to the opening displacement of the cover 6 (which is normally power-assisted by means of electrical or equivalent actuators), and then to swinging of the roll-bar element 2 jointly with the top element 3 fitted therein, for housing thereof within the storage compartment 7.

In detail, and referring to FIG. 14, this swinging motion is performed by virtue of the contraction of the two linear actuators 32. During the initial phase, shown with dotted lines in FIG. 14, the lower pins 8 of the movable plate 23 are located at the top of the guiding slots 27 of the respective stationary plate 26, and are locked relative thereto by the respective locking rocker elements 29. The upper pins 25 of the movable plates 23 are spaced above the corresponding slits 28 of the stationary plates 26.

Contraction of the two actuators 32 produces initially a rotation of the movable plates 23 about the axis of the respective lower pins 8, whereby the respective upper pins 25 travel along a circular arc path, progressively lowering towards the guiding slits 28 of the stationary plates 26. While lowering, the pins 25 intercept the rocker elements 29, thus operating rotation thereof about the respective pins 30, so as to disengage the pins 8. Consequently, these pins 8 are then allowed to move along the respective guiding slot 27, while correspondingly the pins 25 proceed descending along the guiding slits 28.

At the end of the contraction of the actuators 32, the pins 8 and 25 are located at the bottom of the respective guiding slots and slits 27, 28, and the rocker elements 29 return to the starting position under the action of the respective springs 31.

The above-disclosed rotary-linear displacement of the movable plates 23 performs complete rearwardly overturning of the assembly formed by the roll-bar element 2 and by the top element 3 into the storage compartment 7 (FIG. 6), and the cover 6 can then be moved to the closure position of this compartment (FIG. 7).

Closing of the roof 1 is evidently carried out performing the above-disclosed steps in the reversed way: in particular, as far as displacement of the movable plates 23 from the lowered to the raised position is concerned, it is to be pointed out that the initial extension stroke of the two actuators 32 firstly produces the simultaneous raising of the pins 8 and 25 along the respective guiding slots 27 and guiding slits 28. The rocker elements 29 are thus rotated against the action of the respective springs 31 by the pin 8 themselves, then returning to the starting position so as to restrain these pins 8 at the top ends of the respective guiding slots 27, while the pins 25 complete their displacement upwardly following rotation of the movable plates 23. The arrangement is obviously such that the rocker elements 29 do not interfere with sliding of the pins 25 along the guiding slits 28.

During the following closure displacement of the top element 3, engagement between the pins 14 and the hook elements 22 of the actuators 20 is performed automatically.

It will be apparent from the foregoing that the divisible and swingable rigid roof arrangement according to the invention enables conversion from the fully closed configuration to the fully open configuration through the partially open position, and vice-versa, by means of a remarkably compact and functional system, whose construction is above all designed so as to more rationally exploit the narrow space available for storing the roof components, thus ensuring—in the fully open position of the roof—not only enhanced aesthetical qualities of the automobile, but also a larger loading capacity of the rear luggage compartment of the vehicle.

Naturally the details of construction and the embodiments may be widely varied with respect to what has been disclosed and illustrated, without thereby departing from the scope of the present invention, such as defined in the appended claims.

What is claimed is:

1. A convertible automobile comprising a rear storage compartment, a front windscreen structure having an upper edge, and a divisible roof formed by a rear roll-bar rigid element having an upper edge and by a rigid top element having lateral sides, a front and a rear side and which, in a closed configuration of the roof, is interposed between said upper edges of said windscreen structure and of said roll-bar element and support means for said lateral sides of said top element, wherein said top element is displaceable to a retracted position corresponding to a partially open condition of the roof in which said top element is located in the area of said roll-bar element, wherein in said partially open position of the roof said top element and said roll-bar element can be both jointly lowered into said rear storage compartment of the automobile so as to accomplish full opening of the roof, and wherein:

displacement of said top element towards said partially open position of the roof comprises a first tilting step in which said top element is rotated substantially about said front side thereof so as to lower said rear side thereof below said roll-bar element, and a second step in which said top element is transferred to the inside of said roll-bar element;

joint lowering of said roll-bar element and said top element housed therein is performed by overturning rearwardly said roll-bar element until complete insertion thereof into said storage compartment;

a rigid cover is associated to said storage compartment, said cover being displaceable between an advanced closing position and a retracted opening position of said storage compartment, and wherein said support means are displaceable together with said top element during said first tilting step and during at least part of said second step said top element being then displaceable relative to said support means during the remaining part of said second step.

2. Convertible automobile according to claim 1, wherein said support means comprise a pair of movable brackets arranged at lateral sides of said top element, extending within said roll-bar element and formed with respective longitudinal guide members in each one of which a respective pair of first spaced-apart transverse pins are engaged, said first transverse pins being secured to said top element and each said movable bracket carrying a pair of second transverse pins, a pair of stationary brackets correspondingly arranged at lateral sides of said roll-bar element and formed with respective guide grooves slidably engaged by said pairs of second transverse pins of said movable brackets according to a sliding sequence from above downwardly and from the front rearwardly, and vice-versa; the arrangement being such that, during displacement of said top element towards said partially open position following said first tilting step, said movable brackets run jointly with said top element up to the end of displacement of said second pins along the respective guide grooves of said stationary brackets, and then said top element is displaced relative to said movable brackets due to sliding of said first transverse pins along said longitudinal guide members of said movable brackets.

3. Convertible automobile according to claim 2, wherein linear servo-actuators, pivotally connected between said stationary brackets and said movable brackets, are at least provided to operate said first tilting step of said top element.

4. Convertible automobile according to claim 2, further comprising:

a pair of movable plates fixed to said lateral sides of said roll-bar element in proximity of said stationary brackets and each carrying a respective upper-rear transverse pin and a respective lower-front transverse pin, a pair of corresponding stationary plates placed beneath said movable plates and each formed with a respective guide slot along which the lower-front transverse pin of the corresponding movable plate is rotatably and slidably engaged, and with an upwardly open guide slit adapted to be slidably engaged by the upper-rear transverse pin of the corresponding movable plate so as to guide rearward swinging of said roll-bar element together with said top element placed therein according to a rotary-linear motion.

5. Convertible automobile according to claim 4, wherein a respective movable locking member is associated to each of said stationary plates for temporarily restraining displacement of said transverse lower-front transverse pin along the corresponding guide slot, said movable locking member being operated by said upper-rear transverse pin so as to release said lower-front transverse pin.

6. Convertible automobile according to claim 4, wherein linear servo-actuators, pivotally connected between lateral sides of said storage compartment and said movable plates, are provided for operating said rotary-linear motion.

* * * * *